(12) United States Patent
deKoning

(10) Patent No.: US 6,533,511 B1
(45) Date of Patent: Mar. 18, 2003

(54) MOVABLE CONTAINER LOCK FOR SHIPPING CONTAINERS

(75) Inventor: Todd J. deKoning, Tinley Park, IL (US)

(73) Assignee: Holland Company, Crete, IL (US)

( * ) Notice: Subject to any disclaimer, the term of this patent is extended or adjusted under 35 U.S.C. 154(b) by 0 days.

(21) Appl. No.: 09/889,764

(22) PCT Filed: Dec. 1, 2000

(86) PCT No.: PCT/US00/42529

§ 371 (c)(1),
(2), (4) Date: Jul. 19, 2001

(87) PCT Pub. No.: WO01/42043

PCT Pub. Date: Jun. 14, 2001

Related U.S. Application Data

(60) Provisional application No. 60/168,922, filed on Dec. 3, 1999.

(51) Int. Cl.[7] .................................................. B60P 7/08
(52) U.S. Cl. .......................... 410/73; 410/72; 410/75; 410/76; 410/71; 410/77; 410/80
(58) Field of Search ............................... 410/71–77, 69, 410/80; 248/500, 681; 105/355; 280/406.1

(56) References Cited

U.S. PATENT DOCUMENTS

| | | | | | |
|---|---|---|---|---|---|
| 3,547,048 A | * | 12/1970 | Miller | ......................... | 410/73 |
| 4,129,395 A | | 12/1978 | Theurer et al. | | |
| 4,591,307 A | | 5/1986 | Clive-Smith | ................. | 410/83 |
| 4,645,392 A | | 2/1987 | Takaguchi | .................... | 410/80 |
| 4,758,123 A | | 7/1988 | Corompt | ...................... | 410/77 |
| 4,805,859 A | | 2/1989 | Hudson | | |
| 4,826,371 A | | 5/1989 | Brown | ......................... | 410/54 |
| 4,957,399 A | | 9/1990 | Hove | ........................... | 410/87 |
| 5,012,999 A | | 5/1991 | Donnard | | |
| 5,106,247 A | * | 4/1992 | Hove et al. | .................... | 410/73 |
| 5,160,224 A | | 11/1992 | Schwiebert | ................... | 410/82 |
| 5,570,981 A | | 11/1996 | Brewster | ...................... | 410/70 |
| 5,613,814 A | * | 3/1997 | Jackson | ........................ | 410/70 |
| 5,842,821 A | | 12/1998 | Coslovi et al. | ................ | 410/73 |
| 5,927,916 A | | 7/1999 | Kröll et al. | .................... | 410/83 |
| 5,931,617 A | | 8/1999 | Kröll et al. | ................... | 410/91 |
| 6,210,088 B1 | | 4/2001 | Crosby | ........................ | 410/35 |

FOREIGN PATENT DOCUMENTS

| | | | | |
|---|---|---|---|---|
| EP | 0292369 | | 11/1988 | ...................... 7/13 |

OTHER PUBLICATIONS

Celtec Engineering—selected Product Catalogue pages of socket type locks. 1997/1998, 8 pages.
Buffers—Load Cushioning Container Carrier brochure. <1999; 1 page.
Blair Transport Tech.—Twistlock brochure. <1999; 1 page.
Multi–Stroke Handbrake Controls Ltd.—Multi–Lock Twistlock brochure. <1999; 1 page.
Weissenfalls (Taylor Sales) Lashing Line—Dovetail Twistlock brochure. <1999; 1 page.
Jost Schulz—Corner Castings Twistlock brochure. <1999; 2 page.
Holland Company—The Holland Low–Profile (LP) Automatic Container Lock brochure. 1993; 1 page.
Holland Company—Low Profile Automatic Container Lock brochure. Jan. 4, 1999; 1 page.
Holland Company—Drawing B–24082. Mar. 7, 1990; 1 page.
Holland Company—Drawing B–24284. Apr. 23, 1990; 1 page.
Holland Company—Drawing SB–24814. Jul. 25, 1990; 1 page.

* cited by examiner

*Primary Examiner*—Stephen T. Gordon
(74) *Attorney, Agent, or Firm*—David C. Brezina; Lee, Mann, Smith, McWilliams, Sweeney & Ohlson

(57) ABSTRACT

A movable container lock slides into and out of position laterally and is held in a secure position by the combination of longitudinal and lateral stop blocks coacting with a gravity lock and is further tethered to be moved from one selected position of a vehicle to another so that the need for multiple locks can be minimized and flexibility in selection of containers sizes for lading can be maximized.

4 Claims, 7 Drawing Sheets

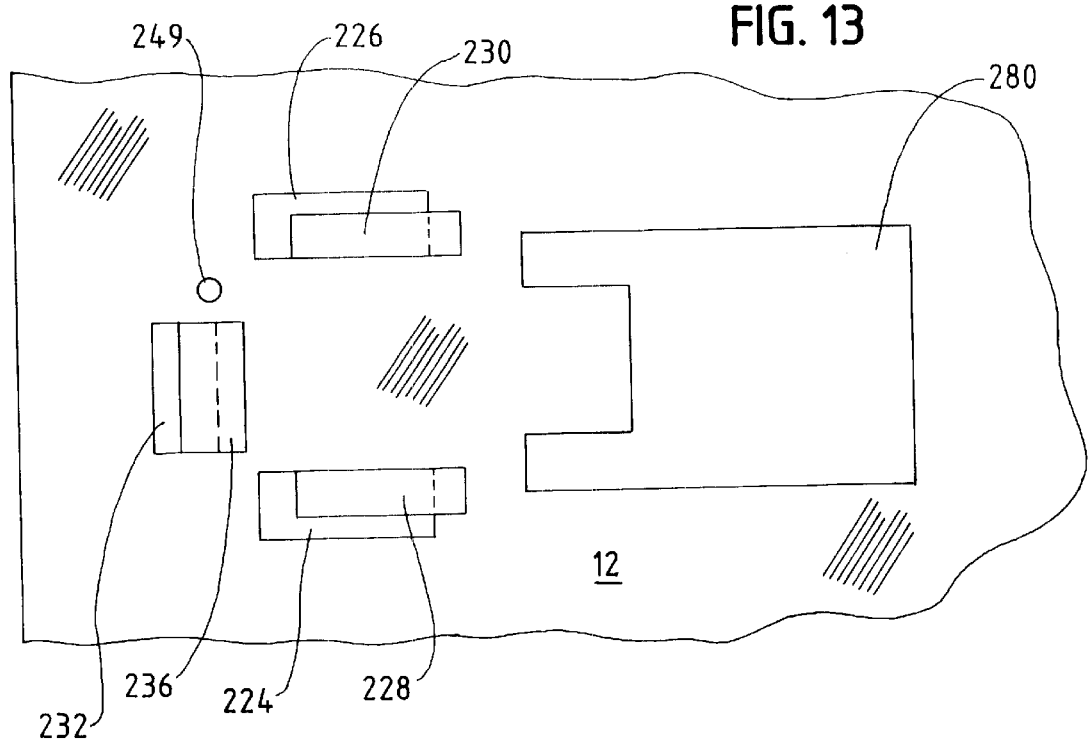
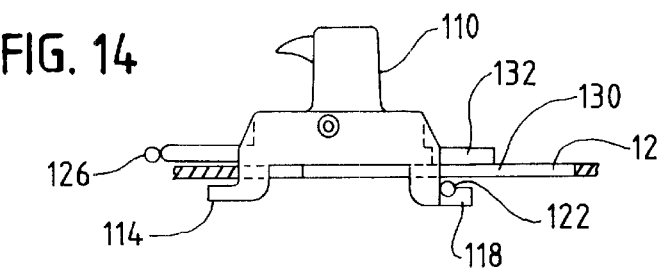
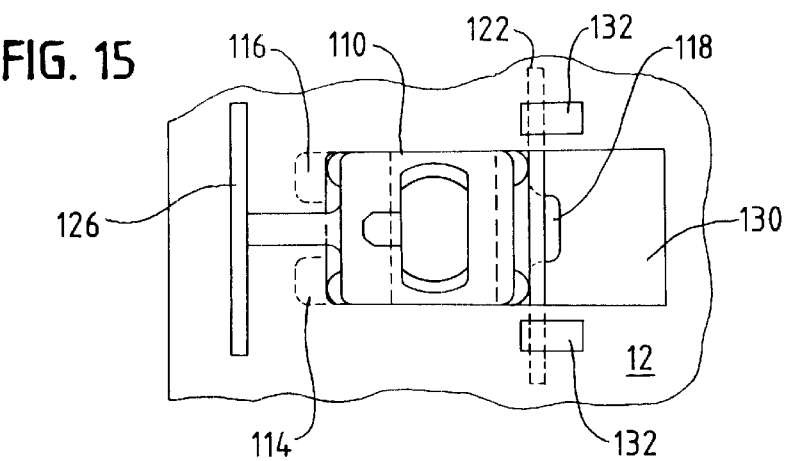

MOVABLE CONTAINER LOCK FOR SHIPPING CONTAINERS

CLAIM OF PRIORITY

Priority is claimed based on U.S. Provisional Patent Application Serial No. 60/168,922, Filed Dec. 3, 1999, entitled "Movable Container Lock For Shipping Containers."

BACKGROUND OF THE INVENTION

1. Field of the Invention

A movable shipping container lock is mountable and demountable on a deck or frame of a vehicle so that the lock can be adapted to different load conditions including a different mix of containers of different length and the like while having unused locks not interfere with the flush mounting of long containers.

2. Description of Related Art

Numerous arrangements for container locks are known including our U.S. Pat. No. 5,570,981, sharing a common assignee with this application. The disclosure in U.S. Pat. No. 5,570,981 is incorporated by reference as if fully set forth herein. Locks are typically mounted by various means including recently by welding using flanges that permit adaptation of a lock to pedestals of specific size.

European Patent No. EP 0292369 entitled "Locking device for containers on a vehicle loading platform, and platform provided therewith." is for a locking device for containers on a vehicle loading platform such as that of a railway wagon or a road vehicle and is characterized in that the opposing faces of bearing planes for the securing members and of these securing members are given complementary shapes which, without opposing any lifting of the securing member, lock it in terms of translational movement in the bearing plane at least in a direction parallel to the longitudinal axis of the platform. In particular, this patent shows a projection or finger, that fits vertically into a complementary opening or aperture, the walls of the opening or aperture preventing longitudinal movement, while the entire lock can be lifted, disengaging the projection from the aperture, and the lock can then be slid along a rod, to which it is slidably affixed through an arm, to a location wherein the lock can be stowed. thereby freeing the deck of the vehicle from the projection of the lock.

BRIEF DESCRIPTION OF THE PREFERRED EMBODIMENT

A container lock for securing shipping containers to a vehicle deck comprising has a lock housing containing a latch mechanism that extends outwardly from the housing to engage a shipping container corner casting. The housing has a combination of projecting wings and lip projecting therefrom in a generally symmetric "T" shaped plan form.

In alternative embodiments, other plan forms may be used, such as combining an "A" shape with a rod or bar under the vehicle deck, sliding into a mounted position and retracting into a hanging demounted position, combining a modified, generally asymmetric, "T" shape with wings and an asymmetric projecting lip, sliding with a pivoting rod, sliding into and out of a mounted position and then pivoting and inverting or "flipping over" to a stowed position.

Locating stops for the symmetric "T" shaped lock are mountable to the deck of the vehicle. Projecting tabs extend from the locating stops. The wings and lips slide under and engage the projecting tabs of the locating stops. Similarly. the asymmetric "T" shaped lock uses locating stops having projecting tabs to receive the wings and lip. The "A" shaped lock uses flanges that engage the plate from which the vehicle deck is formed.

Blocks mountable to the deck position the lock appropriately for longitudinal and lateral positioning for container service and provide container securement by transferring lateral and longitudinal forces between the container and car or wagon. The preferred longitudinally sliding anchor arrangement allows the lock to be moved along the deck to different container securement positions. The alternative embodiments provide for fixed longitudinal positions or stations.

In the longitudinally movable (symmetric "T") embodiment, a tether interconnects the anchor and the lock to keep the lock secure to the car. The tether is formed in a length that allows the lock enough movement to disengage the stop block projecting tabs but not so much movement that the lock can hang over the side of the vehicle.

In the longitudinally movable (symmetric "T") embodiment, the best mode of the invention is practiced using a pivoting gravity lock which prevents the lock from being moved from its position without human intervention. This uses a pivoting pendulous member having a first tab projecting upwardly in a position of rest and a second projecting tab projecting sidewardly in a position of rest, such that said member is pivotable against gravity to move said first tab to a sidewards position and said second tab to an upwards position. The gravity lock's pendulous member is pivotally mounted on a plate, said plate being opaque and selectively concealing and revealing one of said first tabs and second tabs, so that said first tab indicates a lock operable state and said second tab indicates a lock movable state.

The asymmetric "T" embodiment contemplates a pin to fix the lock in place. The "A" shaped embodiment uses the combination of the mechanical elements of slots and the bar or rod to fix the lock in place.

BRIEF DESCRIPTION OF THE DRAWINGS

FIG. 13 is a top plan view of the deck of a vehicle showing the stops and opening into which the asymmetric "T" lock pivots.

FIG. 14 is a side elevational view of the rod type "A" lock in a place on a rail car.

FIG. 15 is a top plan view of the rod type "A" lock in place on a railcar.

DETAILED DESCRIPTION OF THE PREFERRED EMBODIMENT

Figure 1:
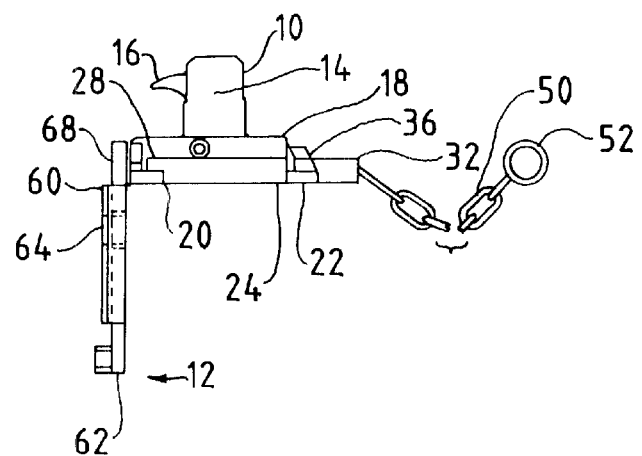
FIG. 1 is a side elevational view of the movable container lock for shipping containers.
Figure 2:
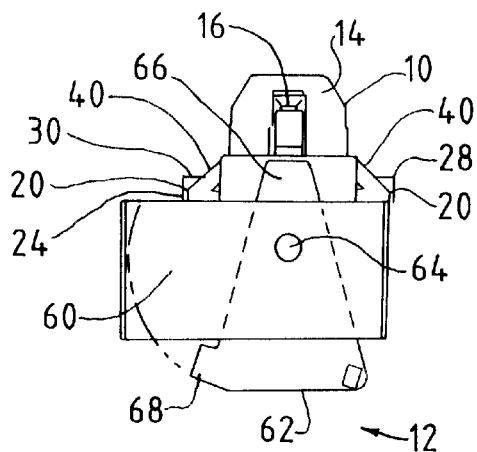
FIG. 2 is a front elevational view of the movable container lock for shipping containers.
Figure 3:
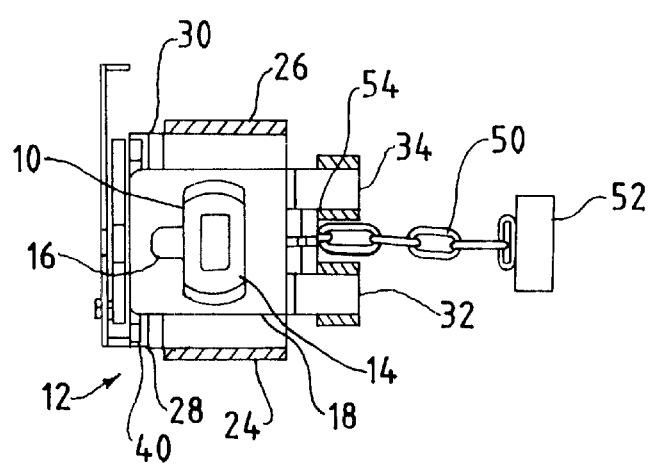
FIG. 3 is a top plan view of the movable container lock for shipping containers
Figure 4:
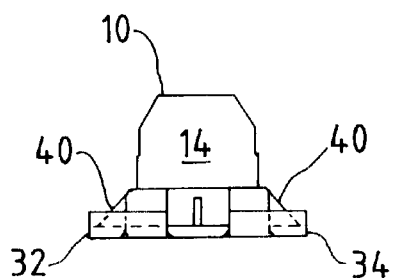
FIG. 4 is a rear front elevational view of the movable container lock for shipping containers.
Figure 5:
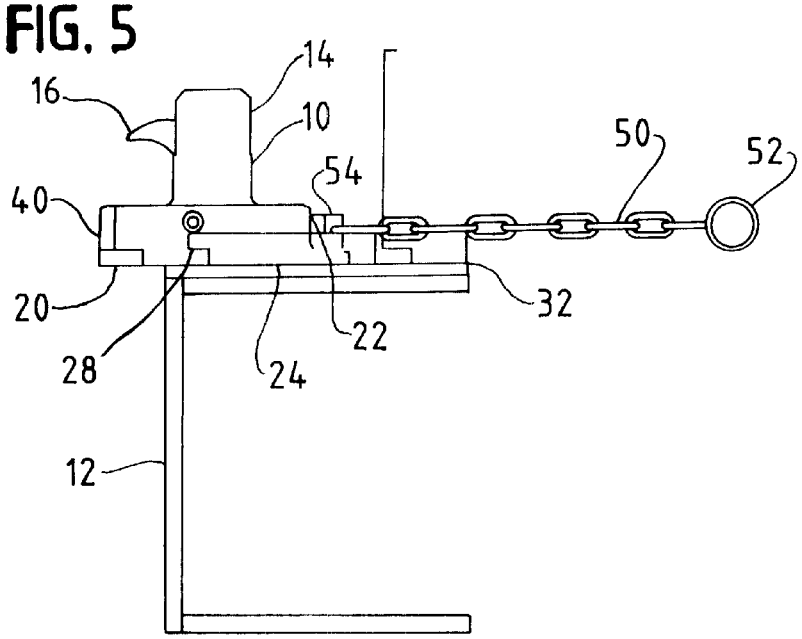
FIG. 5 is a side elevational view of the movable container lock for shipping containers in its disengaged state.
Figure 6:
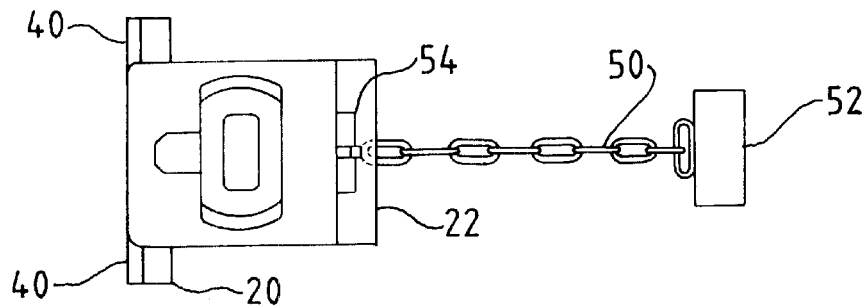
FIG. 6 is a top plan view of the movable container lock for shipping containers in its disengaged state.

Container lock 10 is used for securing standard shipping containers (not shown) by latching their corner castings. Lock 10 is movably and stowably mounted to a vehicle deck or frame 12. This may be, for example, a standard flat car, a European style railroad wagon or the like. Lock housing 14 contains a latch mechanism 16. It will be seen that the latch mechanism 16 extends outwardly from the housing 14 to engage the shipping container corner casting. The housing 14 has a base 18 which has a combination of projecting wings 20 and lip 22 projecting therefrom in a generally "T" shape plan form.

Longitudinal locating stops 24,26 are mountable on the left hand side and right hand side of each selected position of lock 10 to the deck of the vehicle. Projecting tabs 28, 30 extend from the longitudinal locating stops. The wings 20 slide under and engage the projecting tabs 28, 30 of the longitudinal locating stops 24, 26.

Lateral stops 32, 34 are located inboard on the car frame 12. These also have projecting tabs 36, 38, respectively that receive lip 22.

The blocks 24, 26 and 32, 34 act together to position the lock appropriately for longitudinal and lateral positioning for container service and providing container securement by transferring lateral and longitudinal forces between the container and car or wagon. It will be noted that wings 20 are further supported by gussets 40 which helps transfer these loads. This sliding anchor arrangement that allows the lock to be moved along the deck to different container securement positions.

A tether 50 interconnects an anchor 52 and an attachment 54 on lock 10 to keep the lock secure to the car, wagon or other vehicle. The tether 50 is formed in a length that allows the lock 50 enough movement to disengage the wings 20 and lip 22 from the block projecting tabs 28, 30, 36, 38 but not so much movement that the lock can hang over the side of the vehicle frame or deck 12. One embodiment of tether 50 is shown, using a chain and pipe for anchor 52. Other arrangements using rods, links or cables could be used commensurate with the needs of the particular vehicle.

Figure 7:
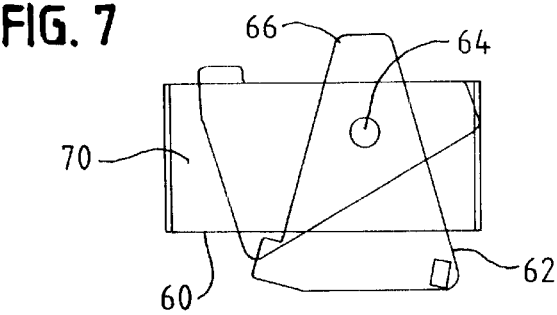
FIG. 7 is a side elevational view of the gravity lock for the container lock.
Figure 8:
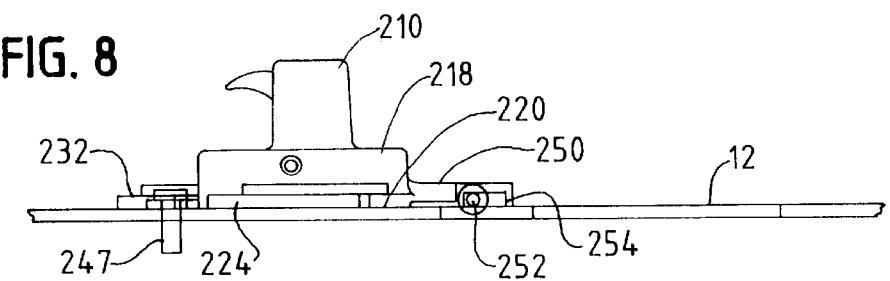
FIG. 8 is a side elevational view of the asymmetric "T" lock deployed on a railcar.

A pivoting gravity lock 60 prevents the lock 10 from being moved from its position without human intervention. This uses a pivoting pendulous member 62 that pivots around rod 64. Member 62 has a first tab 66 projecting upwardly in a position of rest and a second projecting tab 68 projecting sidewardly in a position of rest, such that said member 62 is pivotable against gravity to move said first tab 66 to a sidewards position and said second tab 68 to an upwards position. This is shown in FIG. 7. The gravity lock's pendulous member 62 is pivotally mounted on a plate 70. The plate 70 is not only structural, but being opaque also selectively conceals and reveals first tab 66 and second tab 68, so that the visible first tab 66 indicates a lock operable state and when only the second tab 68 is visible, it indicates a lock movable state. The lock movable state is one where the lock is not secure and therefore the container will not be secure on the car or wagon.

DESCRIPTION OF THE ALTERNATIVE EMBODIMENTS

Figure 16:
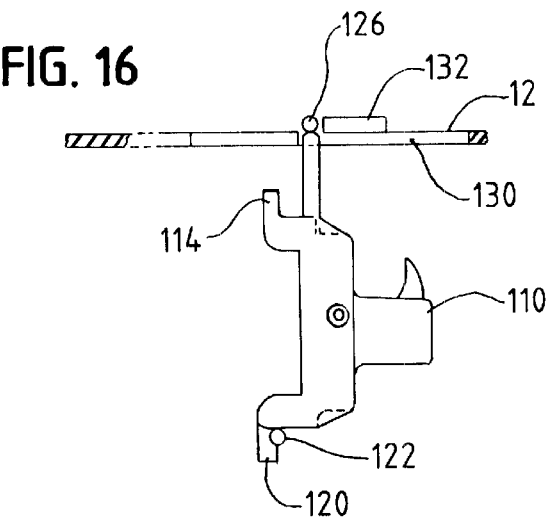
FIG. 16 is side elevational view of the ride type "A" Lock stowed on a rail car.
Figure 17:
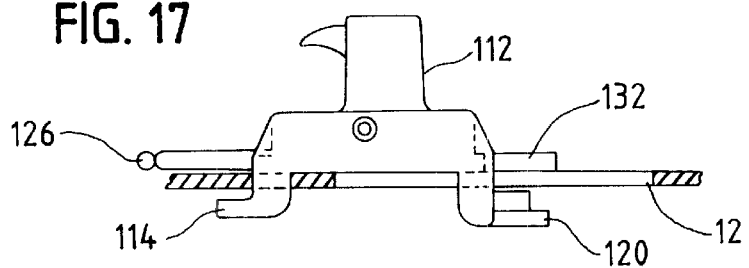
FIG. 17 is a side elevational view of the bar type "A" lock in place on a railcar.
Figure 18:
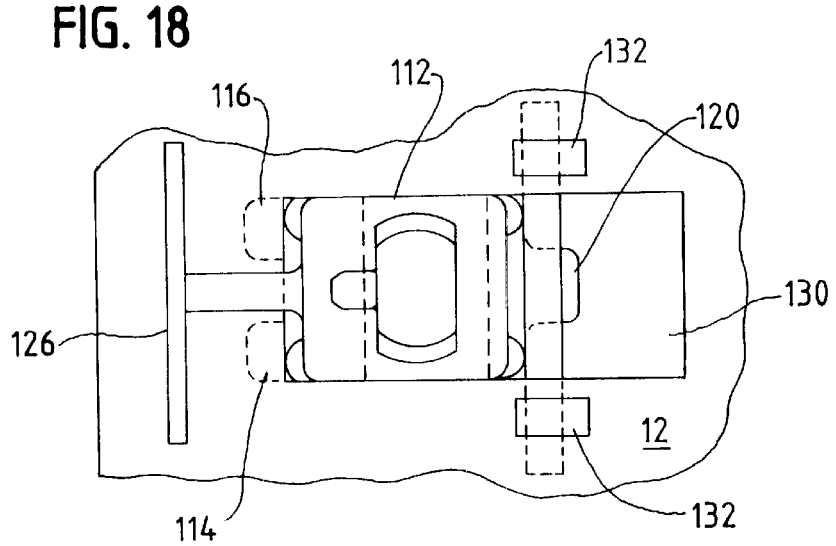
FIG. 18 is a top plan view of the bar type "A" lock in place on a rail car.
Figure 19:
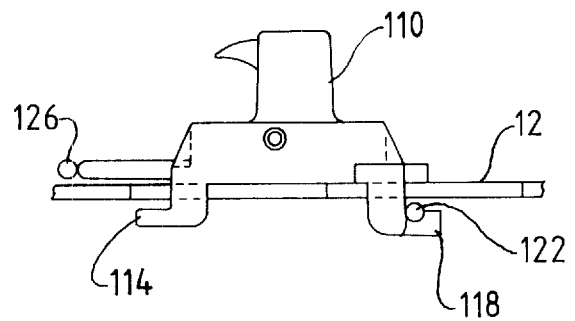
FIG. 19 is a side elevational view of the round type "A" lock being slid from its operational position.
Figure 20:
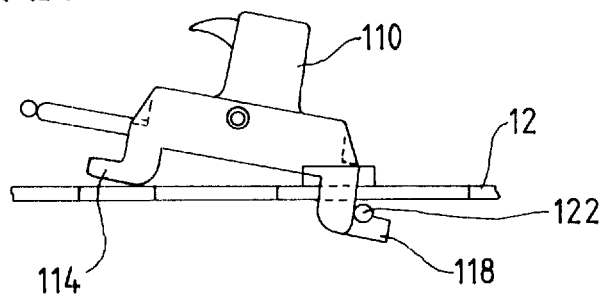
FIG. 20 is a side elevational view of the ride type "A" lock after the view in FIG. 19, being raised and moved to a stowing position.

An "A" shape plan form lock 110, 112 of FIG. 14 through FIG. 21 with a rod, FIGS. 14–16 and FIGS. 19–21, or bar FIGS. 17 and 18, is maintained in container receiving position through the engagement of tabs 114, 116 under the vehicle deck 12, sliding into a mounted position, FIG. 14 and FIG. 17 and retracting into a hanging demounted position, FIG. 16. The "A" shape designation is used for convenience because when viewed in plan, as in FIG. 15 and FIG. 18, tabs 114, 116 form the legs of the "A" and flanges 118, 120 form the apex of the "A".

Figure 21:
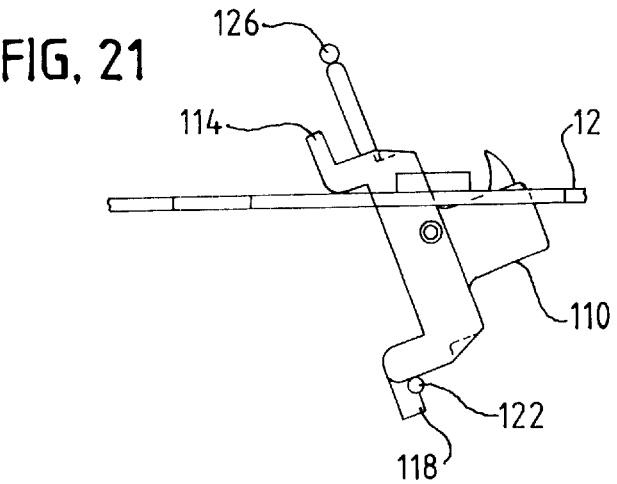
FIG. 21 is a side elevational view of the rod type "A" lock being lured into its stowed position such as FIG. 16.

Extending from the flanges, 118, 120 are, respectively, a rod or bar, 122. Rod or bar 122 function to maintain the operative lock 110 or 112 in position, and to hold the container to the deck 12 because the rod or bar 122 abuts the underside of the deck 12, thereby limiting movement having an upward directional component. The stowing operation, which may be viewed as a movement from the operative position of FIG. 14 to the stowed position of FIG. 16, through the intermediate progression of sliding in FIG. 19, to lifting in FIG. 20 and lowering in FIG. 21 are similar whether the rod or bar 122 is used and will be understood as such by one of ordinary skill. The lifting is performed by manual lifting of handle 126. In either case lock 110, 112 is lowered through a rectangular aperture, 130 in deck 12. Plates 132 provide added strength on deck 12 adjacent aperture 130. The lock 110, 112 is preferably an automatic lock such as taught in U.S. Pat. No. 5,570,981, but other locks could be used.

The alternative generally asymmetric, "T" shape plan form lock 210 is shown in FIGS. 8–12. Like the preferred embodiment, this embodiment uses wings 220 to hold lock 210 in place, working in conjunction with an asymmetric projecting lip 222. Wings 220 and lip 222 engage longitudinal locating stops 224, 226 and lateral stop 232, respectively. Stops 224, 226 in this embodiment have projecting tabs 228, 230 which maintain the lock 210 in position when in its operative location. Similarly, stop 232 has a projecting tab 236 that captures lip 222.

This device is made to slide laterally outwardly relative to the rail car to move to the operative position, and slide laterally inwardly relative to the rail car to disengage stops 224, 226, 232. There term "laterally" is relative to the longitudinal axis of a rail car, and could also mean "transversely" relative to the longitudinal axis of the rail car, the longitudinal axis being understood to be the long dimension of the typical car, and running from the center of one coupler to the other. The principles taught herein are not necessarily intended to be limited to rail cars, as containers need to be locked to decks of various other vehicles.

In the operative position, the lock 210 is maintained in position by the engagement into locking flange 245 of pin 247 which extends into through aperture 248 and into opening 249 in deck 12.

Figure 9:
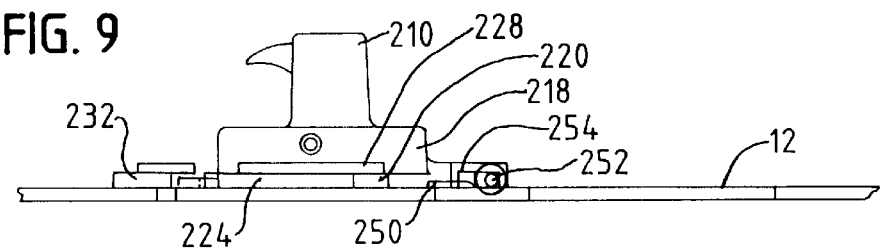
FIG. 9 is a side elevational view of the asymmetric "T" lock being a slid out of an engagement with the stops.
Figure 10:
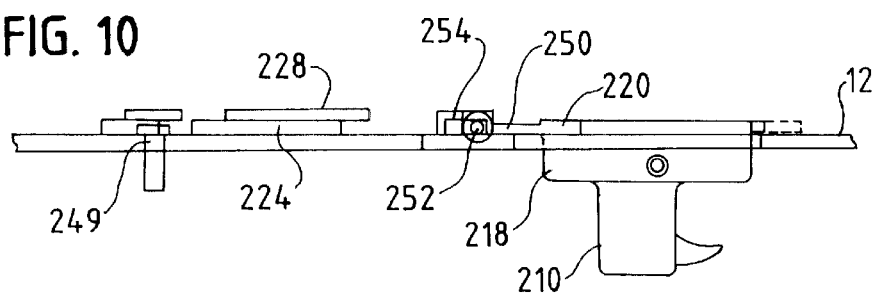
FIG. 10 is a side elevational view of the asymmetric "T" lock pivoted into the stowed position.
Figure 11:
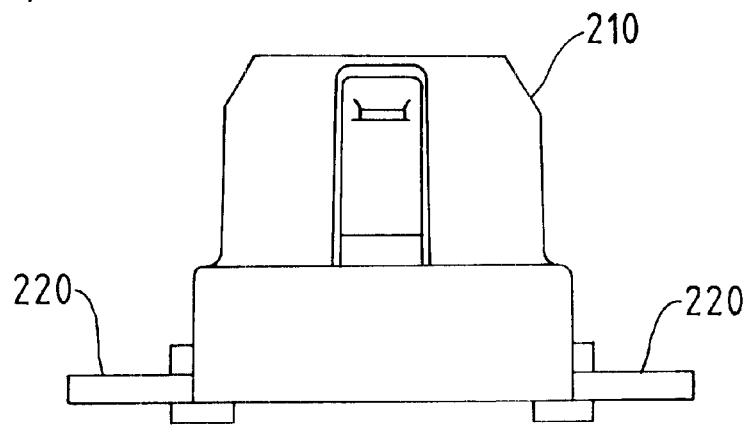
FIG. 11 is a front elevational view of the asymmetric "T" lock.
Figure 12:
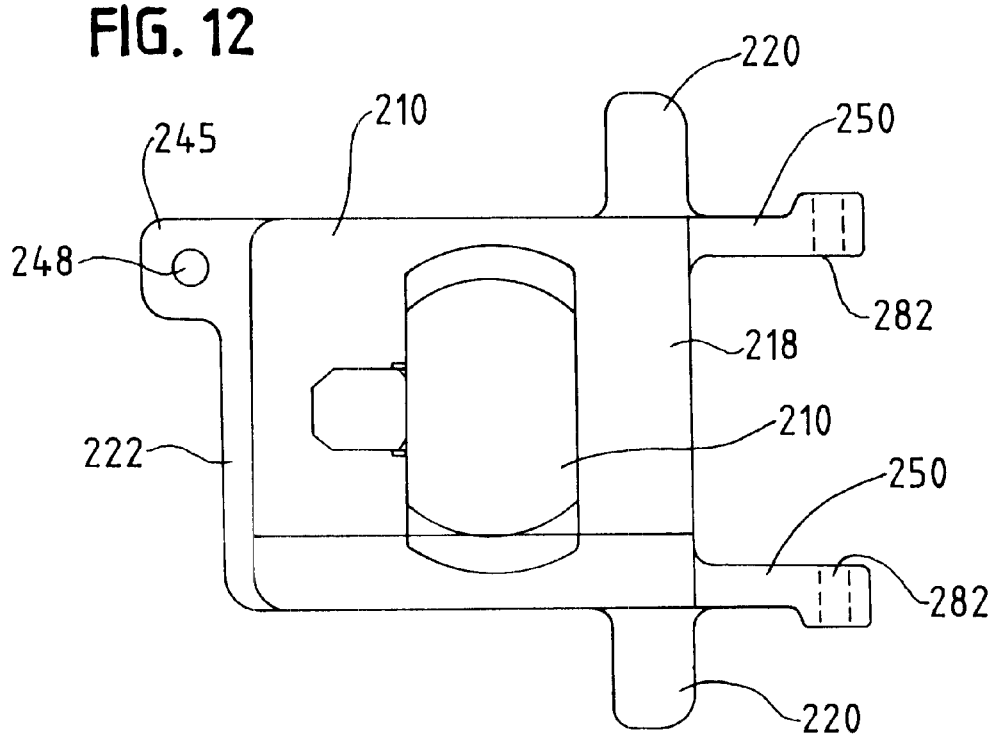
FIG. 12 is a top plan view of the asymmetric "T" lock.

Stowing is accomplished by sliding lock 210 so that stops 224, 226, 232 are disengaged as shown in FIG. 9. Extending inwardly from base 218 is pivot arms 250. Arms 250 have pivot rod 252 extending outwardly through apertures 282, being retained on deck by straps 254 which provide a limit of vertical movement of pivoting rod 252, while permitting sliding of a movement sufficient to disengage stops 224, 226, 232 into and out of a mounted position. When disengaged, as shown in FIG. 9, the entire lock 210 is and then pivot and inverted or "flipped over" to a stowed position as shown in FIG. 10. Aperture 280, FIG. 13, enables the receipt of the inverted lock 210 so that a substantially flat deck 12 can be presented for cargo.

Arms 250, straps 254 and rod 252 coact to provide security against loss or theft and are advantageous for high performance automatic locks of the type discussed herein, although other locks may be used.

While the present invention has been disclosed and described with reference to three embodiments thereof, it will be apparent, as noted above that variations and modifications may be made therein. It is also noted that the present invention is independent of the vehicle on which it is mounted, and is not limited to those vehicles. It is, thus, intended in the following claims to cover each variation and modification that falls within the true spirit and scope of the present invention.

I claim:

1. A container lock for securing a shipping container to a vehicle deck having an assembly comprising:
    a lock housing containing a projecting latch mechanism for engaging the container;
    said housing having wings, lips having horizontal top surface, or ears projecting therefrom;
    locating stops being mountable to the deck;
    projecting tabs extending from said locating stops;
    said wings, lips, or ears sliding under and engaging said projecting tabs of said locating stops;
    wherein the locating stops position the lock housing appropriately for longitudinal and lateral positioning for container service and providing container securement by transferring lateral and longitudinal forces between the container and the vehicle deck.

2. A container lock for securing a shipping container to a vehicle deck having an assembly comprising:
    a lock housing containing a latch mechanism for engaging the container;
    said housing having wings, lips, or ears projecting therefrom;
    locating stops being mountable to the deck;
    projecting tabs extending from said locating stops;
    said wings, lips, or ears sliding under and engaging said projecting tabs of said locating stops;
    wherein the locating stops position the lock housing appropriately for longitudinal and lateral positioning for container service and providing container securement by transferring lateral and longitudinal forces between the container and the vehicle deck;
    a sliding anchor arrangement that allows the lock housing to be moved along the deck to different container securement positions on the deck.

3. A lock assembly according to claim 2 and further comprising:
    a tether interconnecting the anchor arrangement and a lock to keep the lock housing secure with respect to the vehicle deck.

4. A lock assembly according to claim 3, and further having a pivoting gravity lock that prevents the lock housing from being moved from its located position on the deck without human intervention, the gravity lock having a pivoting pendulous member having a first tab projecting upwardly in a position of rest and a second projecting tab projecting sidewardly in a position of rest, such that said member is pivotable against gravity to move said first tab to a sidewards position and said second tab to an upwards position, wherein:
    said pendulous member is pivotally mounted on a plate, said plate being opaque and selectively conceals and reveals above the deck one of said first tab and second tab, so that said first tab revealed above the deck indicates a lock operable state and said second tab being revealed above the deck indicates a lock movable state.

* * * * *